W. E. BAKER.
HUMANE ANIMAL POKE.
APPLICATION FILED MAR. 28, 1912.
1,065,768.
Patented June 24, 1913.
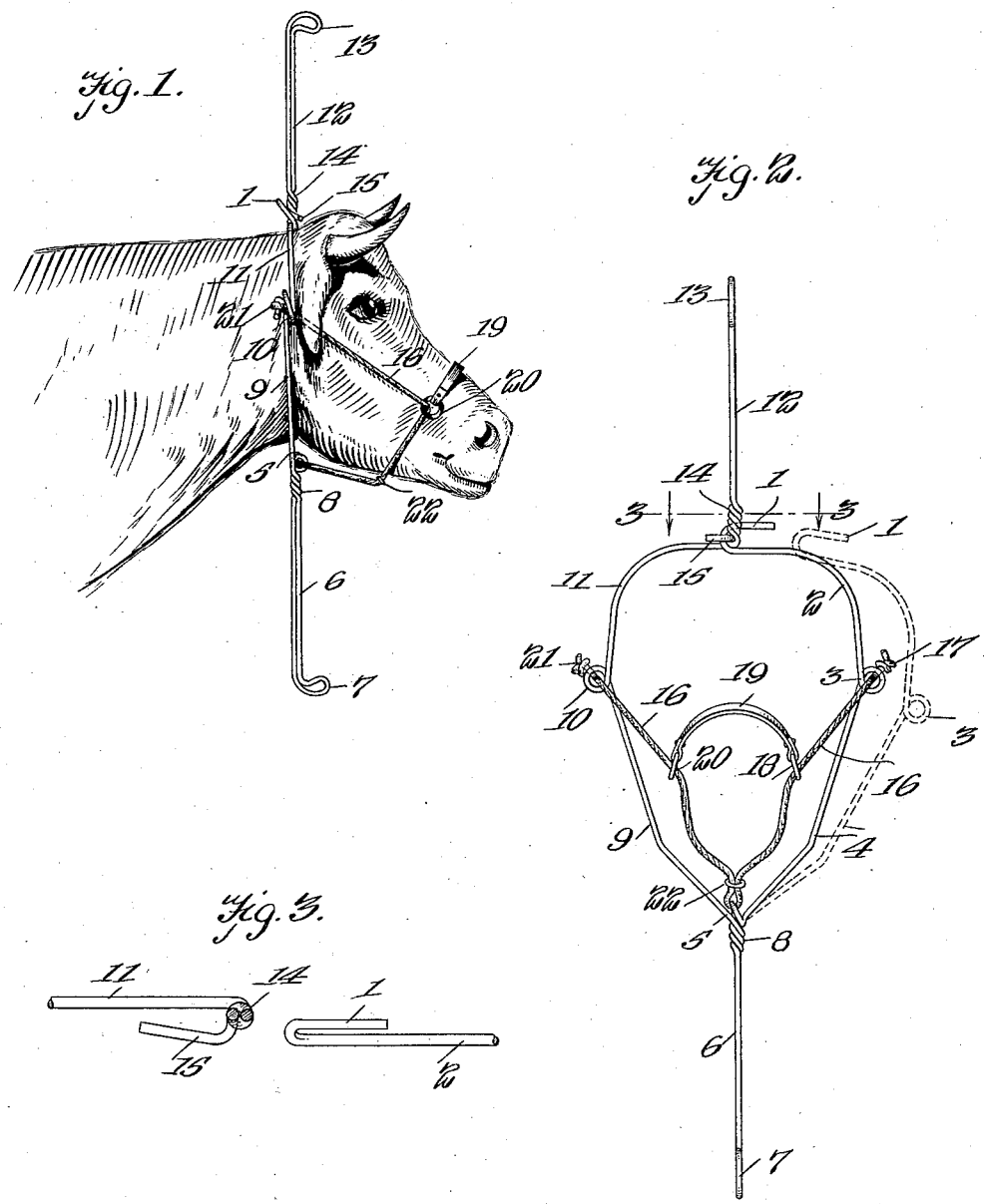
WITNESSES
E. N. Callaghan
L. A. Stanley
INVENTOR
WILLIAM E. BAKER,
BY Munn & Co.
ATTORNEYS

UNITED STATES PATENT OFFICE.

WILLIAM E. BAKER, OF GUTHRIE, OKLAHOMA.

HUMANE ANIMAL-POKE.

1,065,768.

Specification of Letters Patent. Patented June 24, 1913.

Application filed March 28, 1912. Serial No. 636,822

*To all whom it may concern:*

Be it known that I, WILLIAM E. BAKER, a citizen of the United States, and a resident of Guthrie, in the county of Logan and State of Oklahoma, have invented certain new and useful Improvements in Humane Animal-Pokes, of which the following is a specification.

My invention relates to improvements in animal pokes, and it consists in the combinations, constructions and arrangements herein described and claimed.

An object of my invention is to provide a poke which will prevent an animal from endeavoring to force fences, without resulting in injury to the animal.

A further object of my invention is to provide a poke which the animal may wear without creating sores and without annoyance or inconvenience to the animal.

A further object of my invention is to provide a poke which is light, strong, and durable and which may be easily removed or replaced at will.

Other objects and advantages will appear in the following specification, and the novel features of the device will be particularly pointed out in the appended claims.

My invention is illustrated in the accompanying drawings forming part of this application, in which:—

Figure 1 is a view showing the application of my improved poke to an animal, Fig. 2 is a front view of the poke, and Fig. 3 is a section along the line 3—3 of Fig. 2.

In carrying out my invention I provide a main frame adapted to encircle the neck of the animal. This frame is constructed of a single piece of wire. Fig. 2 best illustrates the manner in which this wire is bent to form the frame. One end of the wire is formed in the shape of a hook 1 and is curved around to form an upper portion 2 of the frame, is looped at 3 to form an eye, is brought downwardly and inwardly to form a lower portion 4 of the frame. At the lower end of the portion 4 the wire is looped to form an eye 5 and passes downwardly to form a portion of an arm 6, which is provided with a hook 7 formed by bending the wire back upon itself. The wire then passes upwardly and is twisted around the downwardly extending portion at 8, then passes outwardly and upwardly forming a portion 9 similar to the portion 4, is bent into an eye at 10 corresponding to the eye 3, and passes upwardly and inwardly forming a portion 11 corresponding to the portion 2. From here it passes upwardly forming an arm 12 which is provided with a hook 13 similar to the hook 7. The wire is then bent back upon itself and is twisted around the upwardly extending portion at 14, terminating in a hook 15 extending in the opposite direction from the hook 1.

Arranged to coöperate with the main frame is a halter portion which is formed as follows:—A soft cotton rope 16 is provided with a knot 17 which prevents it from slipping through the eye 3. This rope passes forwardly through a ring 18 in a nose band 19, thence downwardly through the eye 5 and back again through a ring 20 of the nose band 19 and through the eye 10 where it terminates in a knot 21. The loop which passes through the eye 5 is held by a wire clamp or ring 22. The nose band 19 consists preferably of a soft leather strap.

From the foregoing description of the various parts of the device the operation thereof may be readily understood.

The main frame of the poke, together with the halter part made by the nose band 19 and the rope 16 are placed on the animal's head by bringing them up over the fore end of the nose. The two parts of the main frame are sprung apart to permit the sides to pass the head and to permit the upwardly extending arms to pass the horns, after which the two sides are brought together above the neck. The frame is then pressed together so as to bring the hook 1 into engagement behind the hook 15 and the twisted portion 14, as shown in Fig. 2. The frame being made of spring wire the hook 1 will be held firmly in position. One end of the rope 16 may then be drawn backward through its eye and knotted so as to bring the nose band into position to hold the frame securely without putting too much pressure on the nose of the animal. The position of the poke on the animal is that shown in Fig. 1. Now when the animal attempts to push a fence down, the upwardly and downwardly extending arms will engage the fence and draw the nose band tighter. Owing to the pliability of the rope it will not injure the animal, but it annoys it so that after a few efforts the animal finds that every time the fence is pushed the band is tightened and it soon ceases to push the fence.

It will be apparent that the device herein described is more humane than others in which the animal is positively injured, but with my device the annoying sensation of the gripping of the nose is just as effective as positive injury, and of course leaves the animal in perfect condition.

The fact that the entire device, with the exception of the nose band and rope, is made of a single piece of wire, renders the device cheap to manufacture and obviates the necessity of the use of bolts or screws which are liable to come loose.

The device may be quickly applied and adjusted and is of exceedingly light weight when compared with the durability.

I am aware that other devices based upon the same general principle might be made, but I consider as my own all of such modifications as clearly fall within the spirit and scope of the invention.

I claim:

1. In an animal poke, a main frame adapted to encircle the neck of an animal, an upwardly extending arm provided with a hook at its end, a downwardly extending arm provided with a hook, an eye on each side of and at the bottom of said main frame, a flexible halter member secured to one of the eyes on the side of the main frame and extending thence through the eye in the bottom of the main frame and being secured to the other eye on the opposite side of the main frame, a nose band having one end slidably secured to the portion of said flexible halter member between one of the side eyes and the bottom eye, and the other end slidably disposed upon the flexible halter band between the other side eye and the bottom eye, and a slidable ring arranged to encircle both portions of the flexible halter member on each side of said bottom eye and being disposed between said bottom eye and said slidable nose band.

2. In an animal poke, a main frame adapted to encircle the neck of an animal, an upwardly extending arm provided with a hook at its end, a downwardly extending arm provided with a hook, an eye on each side of said main frame, said arms and said eyes being made of a single piece of wire, the ends of said piece of wire forming hooks arranged to engage each other for holding the main frame together, a halter portion comprising a rope extended from said eyes to the bottom of said main frame, a nose band having rings at its ends arranged to encircle the rope between the eyes and the bottom portion of the frame, and a slidable member surrounding the portions of the rope between said nose band and the bottom portion of the frame for holding said portions of the rope together.

WILLIAM E. BAKER.

Witnesses:
H. F. ARDERY,
O. R. COOPER.

---

Copies of this patent may be obtained for five cents each, by addressing the "Commissioner of Patents, Washington, D. C."